United States Patent [19]

Maeda et al.

[11] Patent Number: 4,612,253

[45] Date of Patent: Sep. 16, 1986

[54] RESIN COMPOSITION AND PLATED ARTICLE THEREOF

[75] Inventors: Tetsuro Maeda; Kyoji Onaya; Akihiro Okamoto, all of Chiba, Japan

[73] Assignee: Denki Kagaku Kogyo K. K., Chiba, Japan

[21] Appl. No.: 712,066

[22] Filed: Mar. 15, 1985

[30] Foreign Application Priority Data

Mar. 15, 1984 [JP] Japan .................................. 59-50090
Mar. 22, 1984 [JP] Japan .................................. 59-54859

[51] Int. Cl.$^4$ .............................................. C08J 7/06
[52] U.S. Cl. .................................. 428/521; 428/462; 524/245
[58] Field of Search ................. 428/462, 521; 524/245

[56] References Cited

U.S. PATENT DOCUMENTS 4,013,817  3/1977  Masuda et al. ...................... 428/462
4,337,279  6/1982  Polak ................................... 428/462

FOREIGN PATENT DOCUMENTS 57-170946  10/1982  Japan ................................ 428/462
58-210944  12/1983  Japan ................................ 428/462

*Primary Examiner*—Allan M. Lieberman
*Attorney, Agent, or Firm*—Sughrue, Mion, Zinn, Macpeak & Seas

[57] ABSTRACT

Disclosed is a wet-platable acrylonitrilebutadiene-styrene resin (ABS resin) composition comprising 100 parts by weight of an ABS resin and 0.1 to 10 parts by weight of a compound represented by the following general formula [I]:

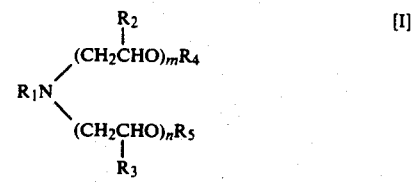

wherein $R_1$ stands for an alkyl group, $R_2$ and $R_3$ each stand for a hydrogen atom or a methyl group, $R_4$ and $R_5$ stand for a hydrogen atom or a group —C(O)$R_6$ in which $R_6$ stands for an alkyl group, and m and n are integers of from 1 to 20.

A plated resin article having an improved plating adhesion can be obtained by wet-plating a molded article formed from this ABS resin composition.

5 Claims, No Drawings

RESIN COMPOSITION AND PLATED ARTICLE THEREOF

BACKGROUND OF THE INVENTION (1) Field of the Invention

The present invention relates to an acrylonitrile-butadiene-styrene resin (hereinafter referred to as "ABS resin") composition. More particularly, the present invention relates to a wet-platable ABS resin composition and a plated article thereof.

(2) Description of the Prior Art

Plating of a resin is ordinarily carried out for imparting a metallic decorative effect, an abrasion resistance and a weatherability to the resin. ABS resins are especially used in this field because excellent plated articles can be easily obtained (e.g. "A Study of the Etching Effect on the Metal-to-ABS Surface Adhesion in Electroless Plating", S. P. Poa, C. C. Wan & C. J. Wu, Metal Finishing, Aug. 13–16 (1977); "A Study of Factors Affecting Peel Adhesion of Electroplated Coating; on ABS and Polypropylene", J. K. Dennis and P. Tipping, Electroplating and Metal Finishing, Nov. 9–16 (1974): Japanese Pat. Kokai Koho 54-103456).

In plated resin articles, however, the plating layer is really peeled from the resin surface according to changes of the ambient temperature because the difference of the linear expansion coefficient between the metal phase and the resin phase is very great, and even in ABS resins, it has been desired to improve the adhesion strength of the plating layer. In the field of vehicles, plated resin articles are especially used in large quantities so as to attain a light weight. In this field, a high adhesion strength enough to cope with severe application conditions is required for plating layers.

As means for improving the adhesion strength of a plating layer in ABS resins, there is known a method of increasing the content of the rubber component, a method of increasing the diameter of rubber particles and a method of increasing the acrylonitrile content. However, according to these methods, no practically sufficient adhesion strength can be obtained. Japanese Patent Application Laid-Open Specification No. 103456/79 teaches a technique of adding an organic silicon compound to an ABS resin. However, the degree of improvement of the adhesion strength of a plating layer attained according to this technique is insufficient, and since the organic silicon compound is expensive, this technique is disadvantageous from the economical viewpoint.

A plated resin article obtained by plating of a light-transmitting ABS resin, especially a partially plates resin article, has an information display function utilizing as a signal a change of the intensity of transmitted light and/or the color of transmitted light, because an unplated portion (non-plated portion) has a light-transmitting property. For example, the shape of the non-plated portion is utilized as a symbol indicating a function state to be discriminated by this symbol. As specific embodiments, there can be mentioned applications to switches and push buttons of light electric appliances, and if a shape of a letter is given to the non-plated portion, the on-off state of a switch or push button indicated by this shape can be displayed.

Although a plated resin article obtained by plating of a light-transmitting ABS resin is industrially valuable, only a very few products of this type are practically utilized. This is because it is difficult to form a tight wet-plating layer on a light-transmitting ABS resin.

In the production of a light-transmitting ABS resin, it is generally necessary to match the refractive index of the dispersed rubber phase with that of the continuous resin phase, and for this purpose, methyl methacrylate is ordinarily added to monomers constituting the continuous resin phase. However, we have found that where a compound having an ester bond is contained in the continuous resin phase, the adhesion of the plating layer in the final plated ABS resin article is extremely poor. In view of this fact, in order to obtain a plated article of a light-transmitting ABS resin having a plating layer excellent in the adhesion, it is considered necessary to subject a light-transmitting ABS resin, which does not contain a compound having an ester bond, that is, methyl methacrylate, in the continuous resin phase, to wet plating.

SUMMARY OF THE INVENTION

It is a primary object of the present invention to provide a wet-platable ABS resin composition.

Another object of the present invention is to provide a plated article of an ABS resin which has a good adhesion strength of a plating layer.

Still another object of the present invention is to provide a wet-platable light-transmitting ABS resin composition having a good adhesion strength of a plating layer.

In accordance with the present invention, there is provided an ABS resin composition comprising 100 parts by weight of an ABS resin containing a diene type rubber and 0.1 to 10 parts by weight of a compound represented by the following general formula [I]:

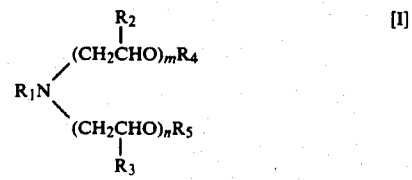

wherein $R_1$ stands for an alkyl group, $R_2$ and $R_3$ each stand for a hydrogen atom or a methyl group, $R_4$ and $R_5$ each stand for a hydrogen atom or a group —C(O)$R_6$ in which $R_6$ stands for an alkyl group, and m and n are integers of from 1 to 20.

Furthermore, in accordance with the present invention, there is provided a plated article formed by wet-plating a molded article formed of an ABS resin composition comprising 100 parts by weight of an ABS resin containing a diene type rubber and 0.1 to 10 parts by weight of a compound represented by the following general formula [I]:

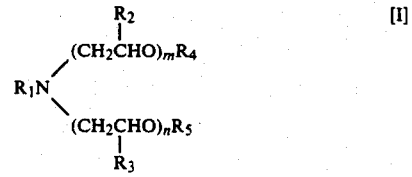

wherein $R_1$, $R_2$, $R_3$, $R_4$, $R_5$, m and n are as defined above.

DETAILED DESCRIPTION OF THE INVENTION

The ABS resin used in the present invention preferably comprises 5 to 30% by weight of a conjugated diene type rubber, 40 to 80% by weight of an aromatic vinyl compound and 10 to 40% by weight of a vinyl cyanide compound.

As the conjugated diene type rubber, there can be mentioned poly(butadiene), poly(isoprene), poly(chloroprene), poly(butadiene-styrene), poly(butadiene-methyl methacrylate) and poly(butadiene-acrylonitrile). As the aromatic vinyl compound, there can be mentioned styrene, α-methylstyrene, t-butylstyrene and vinyltoluene, and as the vinyl cyanide compound, there can be mentioned, for example, acrylonitrile and methacrylonitrile.

If the content of the conjugated diene rubber is lower than 5% by weight, the adhesion strength of a plating layer is insufficient in a plated resin article, and if the content of the conjugated diene type rubber exceeds 30% by weight, the moldability of the ABS resin is degraded and no good results can be obtained. If the content of the vinyl cyanide content is lower than 10% by weight, the impact resistance and rigidity of the ABS resin are insufficient and the adhesion strength of a plating layer is poor in a plated resin article. If the content of the vinyl cyanide compound exceeds 40% by weight, the moldability of the ABS resin is insufficient and therefore, the adhesion strength of a plating layer is reduced because of the residual strain generated by molding.

The ABS resin used in the present invention may contain up to 20% by weight of an acrylic compound. As the acrylic compound, there can be mentioned methyl methacrylate, ethyl acrylate, butyl acrylate, hexyl acrylate, octyl acrylate, hydroxyethyl acrylate and methoxyethyl acrylate. If the content of the acrylic compound exceeds 20% by weight, the adhesion strength of a plating layer is reduced in a plated resin article and no good results can be obtained.

The light-transmitting property of the ABS resin is influenced by the weight-average particle size of the diene type rubber. If the weight-average particle size is smaller than 150 mμ, preferably smaller than 100 mμ, a light-transmitting ABS resin is obtained.

A large-particle diene type rubber having a weight-average particle size not smaller than 150 mμ, preferably not smaller than 200 mμ, especially preferably not smaller than 250 mμ, may be incorporated in the ABS resin used in the present invention. This incorporation of a large-particle diene type rubber often results in improvement of the adhesion strength of a plating layer. The amount of the large-particle diene type rubber to be incorporated is not particularly limited and if a weight average particle size of the mixture of the large-particle and small-particle diene rubbers is smaller than 150 mμ, ABS resins obtained have a light-transmitting property.

As means for introducing the large-particle diene type rubber into the ABS resin, there can be mentioned, for example, a method in which a small-particle diene type rubber latex is mixed with a large-particle diene type rubber latex in advance and the mixture is then subjected to emulsion graft polymerization, a method in which during or after emulsion graft polymerization of one rubber latex, the other rubber latex is added to the polymerization mixture and emulsion graft polymerization is continued, and a method in which a small-particle diene type rubber latex and a large-particle diene type rubber latex are separately subjected to emulsion graft polymerization and the products are mixed. Any of these methods can be adopted in the present invention.

In the present invention, the ABS resin may be a mixture comprising 8 to 100% by weight of an ABS resin containing 5 to 62.5% by weight of a diene type rubber and 0 to 92% by weight of an AS resin. When an ABS resin having a diene type rubber content lower than 5% by weight is incorporated, the adhesion strength of a plating layer is poor, and if an ABS resin having a diene type rubber content exceeding 62.5% by weight is incorporated, silver streaks are formed on the surface of a molded article and no good results can be obtained. The AS resin referred to herein means a copolymer of a vinyl cyanide monomer with an aromatic vinyl monomer. As the vinyl cyanide monomer, there can be mentioned acrylonitrile and methacrylonitrile, and as the aromatic vinyl monomer, there can be mentioned styrene, α-methylstyrene, t-butylstyrene and vinyltoluene.

The ABS resin composition of the present invention comprises a compound represented by the above-mentioned general formula [I] in an amount of 0.1 to 10 parts by weight, preferably 0.5 to 8 parts by weight, per 100 parts by weight of the ABS resin.

As the alkyl group as $R_1$ and $R_6$ in the general formula [I], there can be mentioned a methyl group, an ethyl group, a propyl group, a butyl group, a hexyl group, an octyl group, a decyl group, a dodecyl group, a tetradecyl group, a hexadecyl group, an octadecyl group and an eicosyl group, and the alkyl group may contain an unsaturated bond in the carbon chain. If m and n are integers larger than 20, the compatibility of the compound of the formula [I] with the ABS resin is degraded and no good results can be obtained. A compound of the general formula [I] where $R_1$ stands for a hexyl group or a higher alkyl group and m and n are integers of from 1 to 10 is especially preferred.

As specific examples of the compound of the general formula [I], there can be mentioned

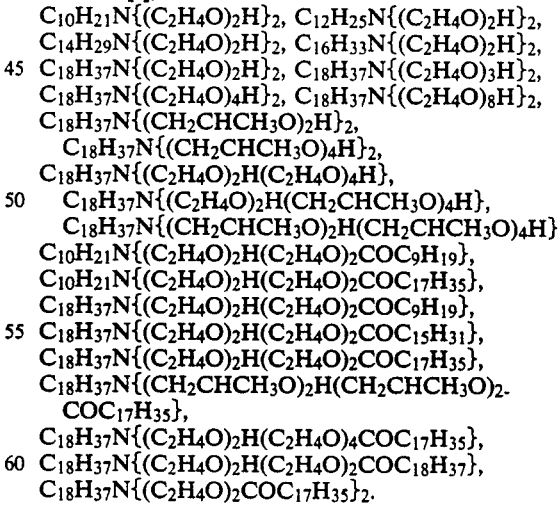

The compound of the general formula [I] can be prepared, for example, by a dehydration-condensation reaction between a primary alkyl amine and a polyethyleneglycol.

In the case where the compound of the general formula [I] is prepared on an industrial scale, it is difficult to obtain a pure compound in which each of $R_1$, $R_2$, $R_3$, R4, R5, m and n is strictly defined as one structure or numerical value, and a mixture of compounds differing in the structure and/or the numerical value is ordinarily prepared. In the present invention, no disadvantage is brought about by using a mixture of compounds represented by the general formula [I].

It is preferred that the compound represented by the general formula [I] should have a boiling point higher than 200° C. under atmospheric pressure. If the boiling point is lower than 200° C., molding defects such as silver streaks are often observed when preparing the ABS resin composition containing this compound.

If the content of the compound represented by the general formula [I] is lower than 0.1 part by weight per 100 parts by weight of the ABS resin, the effect of improving the adhesion strength of a plating layer is insufficient, and if the content of the compound of the general formula [I] is higher than 10 parts by weight per 100 parts by weight of the ABS resin, the adhesion strength of a plating layer is reduced and the rigidity and heat resistance of the ABS resin are degraded.

Known plating techniques customarily applied to ordinary ABS resins can be utilized for wetplating a molded article of the ABS resin composition of the present invention. Wet plating may be applied to the molded article entirely or partially. For partial plating, the molded article is covered with a masking material in a portion not to be plated. This partial plating technique is disclosed in Japanese Patent Publication No. 16987/73 or Japanese Patent Application Laid-Open Specification No. 124432/77. Of course, applicable techniques are not limited to such known techniques but other techniques may be adopted.

The present invention will now be described in detail with reference to the following examples. Incidentally, in the examples and comparative examples, all of "parts" and "%" are by weight.

The weight average particle size (dw) referred to in the examples and comparative examples is represented by the following formula:

$$dw = \Sigma f_i d_i^4 / \Sigma f_i d_i^3$$

wherein fi stands for the fractional ratio of the particle size di.

The absorbance of a latex having a known value of dw was measured under certain given conditions of the wavelength of incident light and the concentration of the latex, and a calibration curve indicating the relation between the value of dw and the absorbance was prepared. The absorbance of a latex having an unknown value of dw was measured under the same conditions and the value of dw was determined from the calibration curve.

REFERENTIAL EXAMPLE 1 (Preparation of ABS-1)

An autoclave was charged with 280 parts of pure water and 100 parts, in terms of solids, of a polybutadiene latex (having a solid content of 35%) having a weight average particle size of 60 mμ, and 1.0 part of potassium stearate, 0.0075 part of ferrous sulfate, 0.015 part of sodium ethylenediaminetetraacetate and 0.45 part of sodium formaldehyde sulfoxylate were added and the mixture was heated at 50° C. with stirring. Then, a liquid mixture comprising 45 parts of acrylonitrile, 105 parts of styrene, 0.9 part of t-dodecylmercaptan and 0.3 part of diisopropylbenzene hydroperoxide was continuously added to the above mixture over a period of 5 hours. After completion of the addition, 0.15 part of diisopropylbenzene hydroperoxide was further added, and the mixture was stirred at 70° C. for 2 hours to complete the polymerization. The yield was 98%.

An aqueous solution of calcium chloride was added to the obtained polymer latex, and the graft polymer was recovered.

45 parts of this graft polymer was mixed with 55 parts of an acrylonitrile/styrene suspension copolymer (AS resin having an acrylonitrile content of 25%), and the mixture was fed to an extruder and pelletized.

The obtained light-transmitting ABS resin is designated as "ABS-1".

REFERENTIAL EXAMPLE 2 (Preparation of ABS-2)

An autoclave was charged with 560 parts of pure water and 100 parts, in terms of solids, of a polybutadiene latex (having a solid content of 35%) having a weight average particle size of 60 mμ, and 1.0 part of potassium stearate, 0.015 part of ferrous sulfate, 0.03 part of sodium ethylenediaminetetraacetate and 0.9 part of sodium formaldehyde sulfoxylate were added and the mixture was heated at 50° C. with stirring. Then, a liuqid mixture comprising 75 parts of acrylonitrile, 225 parts of styrene, 1.8 parts of t-dodecylmercaptan and 0.6 part of diisopropylbenzene hydroperoxide was continuously added to the above mixture over a period of 5 hours. After completion of the addition, 0.3 part of diisopropylbenzene hydroperoxide was further added and the mixture was stirred at 70° C. for 2 hours to complete the polymerization. The yield was 98%.

An aqueous solution of calcium chloride was added to the polymer latex, and the polymer was recovered.

To 72 parts of the obtained polymer was added 28 parts of an acrylonitrile/styrene suspension copolymer (AS resin having an acrylonitrile content of 25%), and the resin composition was supplied to an extruder and pelletized.

The obtained light-transmitting ABS resin is designated as "ABS-2").

REFERENTIAL EXAMPLE 3 (Preparation of ABS-3)

Preparation of Graft Polymer A1

An autoclave was charged with 560 parts of pure water, 100 parts, in terms of solids, of a small-particle poly(butadiene) latex having a weight-average particle size of 60 mμ (having a solid content of 35%), 10 parts of potassium stearate, 0.015 part of ferrous sulfate, 0.03 part of sodium ethylenediamine tetraacetate and 0.9 part of sodium formaldehyde-sulfoxylate, and the mixture was heated at 50° C. with stirring. A liquid mixture comprising 75 parts of acrylonitrile, 225 parts of styrene, 1.8 parts of t-dodecylmercaptan and 0.6 part of diisopropylbenzene hydroperoxide was continuously added to the mixture over a period of 5 hours. After completion of the addition, 0.3 part of diisopropylbenzene hydroperoxide was further added and the mixture was stirred at 70° C. for 2 hours to complete polymerization. The yield was 98%.

Preparation of Graft Polymer B1

An autoclave was charged with 270 parts of pure water, 100 parts, in terms of solids, of a large-particle poly(butadiene-styrene) latex having a weight average particle size of 550 mμ (having a solid content of 50% and a styrene content of 25%), 2.0 parts of potassium stearate, 0.005 part of ferrous sulfate, 0.01 part of sodium ethylenediaminetetraacetate and 0.3 part of sodium formaldehyde-sulfoxylate, and the mixture was heated at 50° C. with stirring. A liquid mixture comprising 25 parts of acrylonitrile, 75 parts of styrene, 0.6 part of t-dodecylmercaptan and 0.2 part of diisopropylbenzene hydroperoxide was continuously added to the mixture over a period of 3 hours. After completion of the addition, 0.1 part of diisopropylbenzene hydroperoxide was further added, and the mixture was stirred at 70° C. for 2 hours to complete polymerization. The yield was 96%.

Mixing and Pelletizing 28 parts, in terms of solids, of the latex of the graft polymer A1 was mixed with 1 part, in terms of solids, of the latex of the graft polymer B1 in the latex state, and an aqueous solution of calcium chloride was added to the mixture and the mixed polymer was recovered.

30 parts of an acrylonitrile-styrene suspension copolymer (AS resin having an acrylonitrile content of 25%) was incorporated in 70 parts of the mixed graft polymer, and the mixture was supplied to an extruder and pelletized.

The obtained light-transmitting resin is designated as "ABS-3".

Pellets of ABS-1, ABS-2 and ABS-3 were injection-molded at a molding temperature of 240° C. with an injection molding machine (Model IS80CN-V supplied by Toshiba Kikai Kabushiki Kaisha) to obtain plate-like molded articles having a size of 80 mm × 50 mm × 3 mm. The total light transmissions of the molded articles were 64.5%, 60.6% and 61.9%, respectively, as measured according to the method of ASTM D-1003.

When the melt flow indexes of ABS-1, ABS-2 and ABS-3 were measured according to the method of JIS K-6870 (at 250° C. under a load of 5 kg), it was found that the melt flow indexes were 18.0 g/10 min, 19.2 g/10 min and 19.4 g/10 min, respectively.

EXAMPLE 1 AND COMPARATIVE EXAMPLE 1

ABS-1, ABS-2 or ABS-3 was mixed at a ratio shown in Table 1 with a compound represented by the following formula [II]:

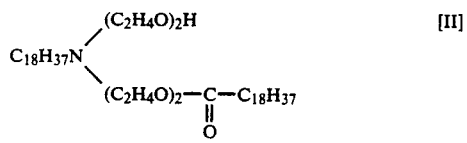

and the mixture was supplied to an extruder and pelletized.

The pelletized resin composition was injection-molded at a molding temperature of 240° C. with an injection molding machine (Model IS80CN-V supplied by Toshiba Kikai Kabushiki Kaisha) to obtain a plate-like molded article having a size of 80 mm × 50 mm × 3 mm. The total light transmission of the molded article was measured to obtain results shown in Table 1. A letter "PLAY" was screen-printed on the central portion of one surface of the molded article with a vinyl chloride resin masking ink, and the corresponding portion of the back surface was broadly covered with the same masking ink. The molded article was subjected to wet plating according to procedures described below. The letter "PLAY" could be clealy read by transmitted light in the obtained plated article.

"Wet Plating Process"

(1) Degreasing (isopropyl alcohol): at room temperature for 5 seconds
(2) Etching (chromic anhydride/sulfuric acid liquid mixture): at 70° C. for 15 minutes
(3) Neutralization (hydrochloric acid): at room temperature for 2 minutes
(4) Catalyzing (palladium chloride/stannous chloride/aqueous hydrochloric acid solution): at room temperature for 2 minutes
(5) Accelerating (aqueous solution of sulfuric acid): at 55° C. for 2 minutes
(6) Chemical Plating (nickel sulfate/sodium citrate/sodium hypophosphite/sodium acetate/aqueous ammonium chloride solution): at 32° C. for 5 minutes
(7) Electric Copper Plating: 20μ in thickness
(8) Electric Nickel Plating: 7μ in thickness
(9) Chromium Plating: 0.3μ in thickness The above-mentioned plate-like molded article was directly subjected to wet plating without masking, and the plated resin article was allowed to stand still for 2 hours in an environment maintained at 85° C. and immediately placed in an atmosphere maintained at −30° C. for 2 hours. After this heating/cooling cycle, a transparent plate having 160 of the total number of 5 mm squares written thereon was placed on the plated resin plate (80 mm × 50 mm × 3 mm), and the number of squares deprived of the plating layer was counted. This counting was performed on the front and back surfaces of the plated resin plate, and the sum of squares deprived of the plating layer on the front and back surfaces was designated as "the number of peels". The obtained results are shown in Table 1.

TABLE 1

|  | Comparative Example 1 | | | | | Example 1 | | | | | | | | |
| --- | --- | --- | --- | --- | --- | --- | --- | --- | --- | --- | --- | --- | --- | --- |
| Amount (parts) of ABS-1 | 100 | 0 | 0 | 100 | 100 | 100 | 100 | 100 | 100 | 100 | 0 | 0 | 100 | 100 |
| Amount (parts) of ABS-2 | 0 | 100 | 0 | 0 | 0 | 0 | 0 | 0 | 0 | 0 | 100 | 0 | 0 | 0 |
| Amount (parts) of ABS-3 | 0 | 0 | 100 | 0 | 0 | 0 | 0 | 0 | 0 | 0 | 0 | 100 | 0 | 0 |
| Amount (parts) of Compound [II] | 0 | 0 | 0 | 0.05 | 12 | 0.1 | 0.2 | 0.5 | 1.0 | 2.0 | 2.0 | 2.0 | 5.0 | 8.0 |
| Total Light Transmission | 64.5 | 60.6 | 61.9 | 64.5 | 61.4 | 64.3 | 64.3 | 63.9 | 63.3 | 63.3 | 59.2 | 60.9 | 62.8 | 62.2 |

TABLE 1-continued

| | Comparative Example 1 | | | | | | Example 1 | | | | | | |
|---|---|---|---|---|---|---|---|---|---|---|---|---|---|
| Melt Flow Index (g/10 min) | 18.0 | 19.2 | 19.4 | 18.1 | 23.9 | 18.1 | 18.1 | 18.2 | 18.6 | 19.2 | 20.1 | 20.6 | 21.5 | 22.2 |
| Number of Peels | 88 | 38 | 42 | 80 | 69 | 25 | 22 | 20 | 12 | 4 | 0 | 0 | 21 | 28 |

EXAMPLE 2

Procedures of Example 1 were repeated in the same manner except that a compound represented by the following formula [III]:

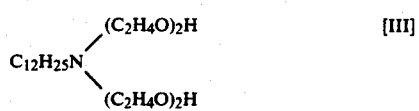

was used in an amount shown in Table 2 instead of the compound of the formula [II], and the number of peels was counted. The obtained results are shown in Table 2.

TABLE 2

| | Example 2 | | | | | |
|---|---|---|---|---|---|---|
| Amount (parts) of ABS-1 | 100 | 100 | 100 | 0 | 0 | 100 |
| Amount (parts) of ABS-2 | 0 | 0 | 0 | 100 | 0 | 0 |
| Amount (parts) of ABS-3 | 0 | 0 | 0 | 0 | 100 | 0 |
| Amount (parts) of Compound [III] | 0.5 | 1.0 | 2.0 | 2.0 | 2.0 | 5.0 |
| Total Light Transmission (%) | 63.7 | 63.3 | 63.2 | 59.1 | 60.7 | 62.2 |
| Melt Flow Index (g/10 min) | 18.1 | 18.8 | 19.2 | 20.2 | 20.5 | 21.7 |
| Number of Peels | 24 | 20 | 11 | 1 | 0 | 21 |

EXAMPLE 3 AND COMPARATIVE EXAMPLE 2

Procedures of Example 1 were repeated in the same manner except that the rubber content in ABS-1 (mixture of the graft polymer and AS resin) was changed as indicated in Table 3. The physical properties were tested. The obtained results are shown in Table 3.

TABLE 3

| | Comparative Example 2 | | | Example 3 | | | |
|---|---|---|---|---|---|---|---|
| Rubber Content (%) | 2 | 2 | 35 | 5 | 10 | 15 | 25 | 30 |
| Amount (parts) of Compound [II] | 2.0 | 0 | 2.0 | 2.0 | 2.0 | 2.0 | 2.0 | 2.0 |
| Amount (parts) of Compound [III] | 0 | 2.0 | 0 | 0 | 0 | 0 | 0 | 0 |
| Total Light Transmission (%) | 82.5 | 82.5 | 29.4 | 78.5 | 73.4 | 68.0 | 48.8 | 37.4 |
| Melt Flow Index (g/10 min) | 38.1 | 38.0 | 0.8 | 34.5 | 27.2 | 20.9 | 9.9 | 4.5 |
| Number of Peels | 70 | 62 | 0 | 29 | 18 | 6 | 0 | 0 |

EXAMPLE 4

100 parts of a powder of an ABS resin (having a weight-average rubber particle size of 350 m$\mu$) comprising 24% of acrylonitrile, 61% of styrene and 15% of butadiene was mixed with a compound represented by the following formula [II]:

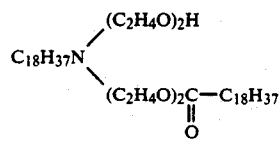

in an amount shown in Table 4, and the mixture was supplied to an extruder and pelletized.

The pelletized resin composition was injection-molded at a molding temperature of 240° C. with an injection molding machine (Model IS80CN-V supplied by Toshiba Kikai Kabushiki Kaisha) to obtain a plate-like molded article having a size of 80 mm × 50 mm × 3 mm. The molded article was wet-plated in the following manner.

"Wet Plating Process"

(1) Degreasing (isopropyl alcohol): at room temperature for 5 seconds
(2) Etching (chromic anhydride/sulfuric acid liquid mixture): at 70° C. for 15 minutes
(3) Neutralization (hydrochloric acid): at room temperature for 2 minutes
(4) Catalyzing (palladium chloride/stannous chloride/aqueous hydrochloric acid solution): at room temperature for 2 minutes
(5) Accelerating (aqueous solution of sulfuric acid): at 55° C. for 2 minutes
(6) Chemical Plating (nickel sulfate/sodium citrate/sodium hypophosphite/sodium acetate/aqueous ammonium chloride solution): at 32° C. for 5 minutes
(7) Electric Copper Plating (aqueous solution of copper sulfate): at 20° C. for 90 minutes The average thickness of the plating layer of the plated resin article was 40$\mu$.

Two cut lines were formed on the plated resin article in the longitudinal direction with a distance of 1.0 cm therebetween, and a strip between the two cut lines was peeled in a direction of 180° and the plating adhesion strength was measured. The obtained results are shown in Table 4.

TABLE 4

| | Run No. | | | | | |
|---|---|---|---|---|---|---|
| | 1 | 2 | 3 | 4 | 5 | 6 |
| Amount (parts) of Compound [II] | 0.2 | 0.5 | 1.0 | 2.0 | 4.0 | 8.0 |

TABLE 4-continued

| | Run No. | | | | | |
|---|---|---|---|---|---|---|
| | 1 | 2 | 3 | 4 | 5 | 6 |
| Plating Adhesion Strength (kg/cm) | 0.82 | 1.24 | 1.65 | 1.64 | 1.48 | 1.00 |

EXAMPLE 5

100 parts of a powder of an ABS resin (having a weight-average rubber particle size of 350 mμ) comprising 19% of acrylonitrile, 17% of butadiene, 45% of α-methylstyrene and 19% of styrene and 2.0 parts of the compound of the formula [III] were supplied to an extruder and pelletized.

The pelletized composition was molded and plated in the same manner as described in Example 4. When the plating adhesion strength was measured, it was found that the plating adhesion strength was 1.62 Kg/cm.

EXAMPLE 6

100 parts of the same ABS resin as used in Example 4 and a compound represented by the following formula [III]:

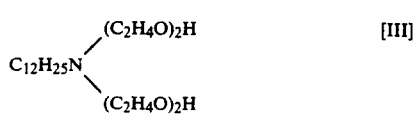

in an amount indicated in Table 5 were supplied to an extruder and pelletized.

The pelletized composition was molded and plated in the same manner as described in Example 4, and the plating adhesion strength was measured. The obtained results are shown in Table 5.

TABLE 5

| | Run No. | | | |
|---|---|---|---|---|
| | 7 | 8 | 9 | 10 |
| Amount (parts) of Compound [III] | 0.5 | 1.0 | 2.0 | 4.0 |
| Plating Adhesion Strength (kg/cm) | 0.98 | 1.42 | 1.54 | 1.22 |

COMPARATIVE EXAMPLE 3

100 parts of the same powdery ABS resin as used in Example 4 and the compound of the formula [II] in an amount shown in Table 6 were supplied to an extruder and pelletized.

The pelletized composition was molded and plated in the same manner as described in Example 4, and the plating adhesion strength was measured. The obtained results are shown in Table 6.

TABLE 6

| | Run No. | |
|---|---|---|
| | 11 | 12 |
| Amount (parts) of Compound [III] | 0.05 | 12 |
| Plating Adhesion Strength (kg/cm) | 0.51 | 0.63 |

COMPARATIVE EXAMPLES 4 AND 5

The ABS resins used in Examples 4 and 5 were molded and plated in the same manner as described in Example 4 except that the compound of the formula [II] was not added, and the plating adhesion strength were measured. It was found that the plating adhesion strengths were 0.44 Kg/cm and 0.37 Kg/cm, respectively.

What is claimed is:

1. A plated resin article formed by wet-plating a molded article composed of a resin composition comprising 100 parts by weight of an acrylonitrile-butadiene-styrene resin containing a conjugated diene type rubber, wherein the acrylonitrile-butadiene-styrene resin comprises 5 to 30% by weight of a conjugated diene type rubber, 40 to 80% by weight of an aromatic vinyl compound, 10 to 40% by weight of a vinyl cyanide compound, and 0.1 to 10 parts by weight of a compound represented by the following general formula [I]:

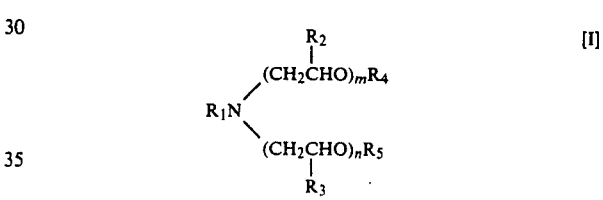

wherein $R_1$ stands for an alkyl group, $R_2$ and $R_3$ each stand for a hydrogen atom or a methyl group, $R_4$ and $R_5$ each stand for a hydrogen atom or a group $-C(O)R_6$ in which $R_6$ stands for an alkyl group, and m an n are integers of form 1 to 20.

2. A plated resin article as set forth in claim 1, wherein in the general formula [I], $R_1$ is a hexyl group or a higher alkyl group and m and n are integers of from 1 to 10.

3. A plated resin article as set forth in claim 1, wherein the weight average particle size of the conjugated diene type rubber is smaller than 150 mμ.

4. A plated resin article as set forth in claim 1, wherein the acrylonitrile-butadiene-styrene resin contains a small-particle conjugated diene type rubber having a weight average particle size smaller than 150 mμ and a large-particle conjugated diene type rubber having a weight-average particle size not smaller than 150 mμ.

5. A plated resin article as set forth in claim 1, wherein the acrylonitrile-butadiene-styrene resin is a mixture comprising 8 to 100% by weight of an acrylonitrile-butadiene-styrene resin containing 5 to 62.5% by weight of a conjugated diene type rubber and 0 to 92% by weight of a vinyl cyanide/aromatic vinyl compound copolymer.

* * * * *